United States Patent [19]

Ver Nooy, III et al.

[11] 4,153,414
[45] May 8, 1979

[54] COLD WATER-SOLUBLE ACID DYE COMPOSITION DERIVED FROM THE STANDARDIZATION OF MONO- AND DISAZO ACID DYES WITH AN AMMONIUM LIGNIN SULFONATE

[75] Inventors: Charles D. Ver Nooy, III, West Chester, Pa.; Armand P. Zinnato, Chattanooga, Tenn.

[73] Assignee: E. I. Du Pont de Nemours and Company, Wilmington, Del.

[21] Appl. No.: 864,607

[22] Filed: Dec. 27, 1977

[51] Int. Cl.$^2$ .................... C09B 27/00; D06P 1/02
[52] U.S. Cl. ........................................ 8/41 R; 8/79; 8/89 R; 8/92
[58] Field of Search ............... 8/41 R, 79, 89 R, 92

[56] References Cited

U.S. PATENT DOCUMENTS

| | | | |
|---|---|---|---|
| 1,812,693 | 6/1931 | Hailwood | 8/94.31 UX |
| 3,100,134 | 8/1963 | Maier et al. | 8/40 |
| 3,546,197 | 12/1970 | Benko et al. | 8/89 |

FOREIGN PATENT DOCUMENTS

| | | |
|---|---|---|
| 1404173 | 8/1975 | United Kingdom. |
| 1441585 | 7/1976 | United Kingdom. |

*Primary Examiner*—A. Lionel Clingman

[57] ABSTRACT

Cold water-soluble dye compositions consisting essentially of from 20–70% by weight of a sparingly soluble sulfonated, mono- or disazo acid dye, substantially in the form of its alkali metal salt, and from 80–30% by weight of an ammonium lignin sulfonate. The ammonium lignin sulfonate is used as a standardizing agent to adjust the strength of the concentrated acid dye to a level suitable for use in commercial dyeing and printing operations and to provide cold water solubility adequate for dyeing at ambient temperatures.

12 Claims, No Drawings

COLD WATER-SOLUBLE ACID DYE COMPOSITION DERIVED FROM THE STANDARDIZATION OF MONO- AND DISAZO ACID DYES WITH AN AMMONIUM LIGNIN SULFONATE

BACKGROUND OF THE INVENTION

1. Field of the Invention

This invention relates to cold water-soluble dye compositions containing sulfonated, mono- or disazo acid dyes and an ammonium lignin sulfonate.

2. Prior Art

Mono- and disazo acid dyes are well known in the art as, for example, described at pages 1001 to 1561 of Volume 1 of the Colour Index, Third Edition, 1971, published jointly by the Society of Dyers and Colourists and the American Association of Textile Chemists and Colorists.

No art is known which describes cold water-soluble mono- or disazo acid dyes containing an ammonium lignin sulfonate. The following art was considered in connection with the present invention:

(1) U.S. Pat. No. 1,379,175 discloses alkaline sulfite wash liquor as a suitable agent for dissolving and blending vat and sulfur colors for dyeing and printing. Such liquors contain lignin sulfonates.

(2) U.S. Pat. No. 1,441,240 discloses the addition of sodium lignin sulfonate to an acid wool dyebath to reduce the tendency of the acid dye to settle out.

(3) U.S. Pat. No. 1,812,693 discloses compositions comprising a disperse dye and the product resulting from the treatment of lignin sulfonic acid with ammonia at elevated temperature and pressure.

(4) U.S. Pat. No. 2,040,796 discloses a method of dyeing wool with metal complex compounds of acid dyes in the presence of sulfite pulp waste liquor.

(5) U.S. Pat. No. 3,100,134 discloses compositions for dyeing polyamides consisting of an anthraquinone-sulfonic acid dye and a water-soluble salt of a lignin sulfonic acid as dispersing agent. No specific salts are disclosed.

(6) U.S. Pat. No. 3,546,197 discloses the use of ammonium lignin sulfonates as vat dye or carbon black dispersants.

(7) U.S. Pat. No. 3,617,176 discloses cold water-soluble 1:2 chromium or cobalt complex azo dye compositions containing a trisodium or tripotassium phosphate solubilizing agent and, optionally, the reaction product of a lignin sulfonic acid and an aromatic amine as dispersing agent.

(8) U.S. Pat. No. 3,948,599 discloses solid, nondusty, noncaking acid dye compositions containing an acid dye, urea and, optionally, an anionic lignin sulfonate or oxylignin sulfonate surface active agent. No specific lignin sulfonate is named.

(9) and (10) Brit. Pat. Nos. 1,404,173 and 1,441,585 disclose water-dispersible dye compositions containing, by weight, 5–99% of an acid dye and 95–1% of a sodium lignin sulfonate surface active agent.

SUMMARY OF THE INVENTION

This invention is cold water-soluble acid dye compositions consisting essentially of from 20 to 70% by weight of a sparingly soluble sulfonated, mono- or disazo acid dye, substantially in the form of its alkali metal salt, and from 80 to 30% by weight of an ammonium lignin sulfonate.

DETAILED DESCRIPTION OF THE INVENTION

Mono- and disazo acid dyes are anionic dyes which are applied to nitrogenous fibers such as wool, silk or synthetic polyamides from acid or neutral dye baths.

These dyes contain sulfonic or carboxylic acid groups which are usually present in salt form to provide water-solubility. The associated cation in most cases is sodium. The degree of water-solubility depends on the overall constitution of the dye molecule and upon the number of water-solubilizing groups that it contains. However, many mono- and disazo acid dyes, particularly those containing a single water-solubilizing group, are only sparingly soluble in water. In order to prepare aqueous solutions of these sparingly soluble dyes, it is necessary for the dyer to first prepare an aqueous suspension of the dye and then to heat the suspension, usually with live steam, to provide a solution. It would be advantageous if these time and energy consuming operations could be eliminated or curtailed. The present invention avoids these problems by providing acid dye compositions which are easily dissolved in cold water, particularly in cold hard water.

According to the invention, there is provided a cold water-soluble dye composition consisting essentially of, by weight, from 20 to 70% of a sparingly soluble mono- or disulfonated, mono- or disazo acid dye, substantially in the form of its alkali metal salt, and from 80 to 30% of an ammonium lignin sulfonate.

Mono- and disazo acid dyes containing either one or two sulfonic acid groups can be used in the invention compositions. Dramatic increases in cold water-solubility have been achieved with monosulfonated, monoazo dyes and these dyes are particularly preferred herein. Examples of mono- and disulfonated acid dyes for use in the invention include but are not limited to those of the following structures.

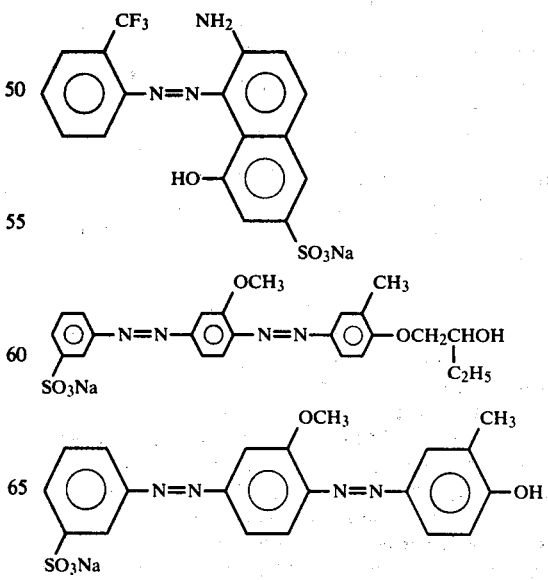

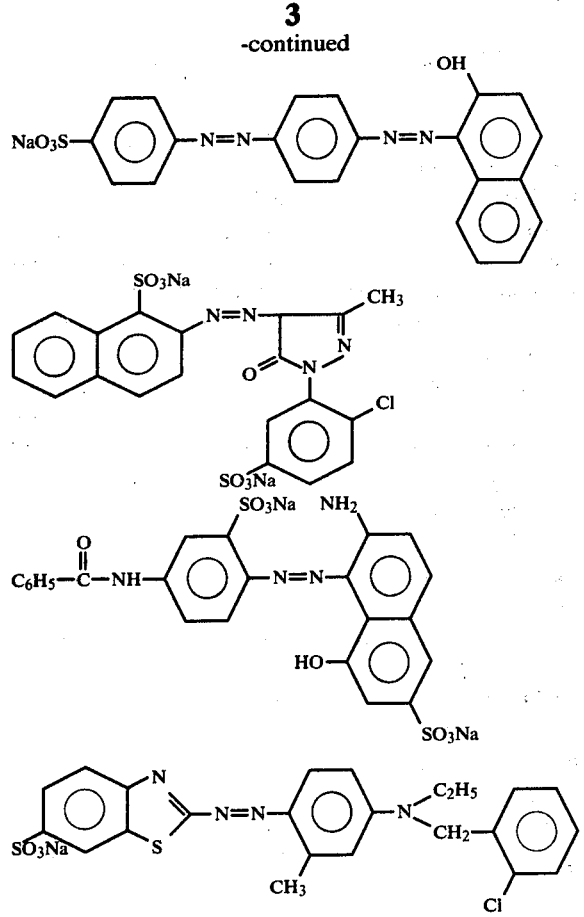

Ammonium lignin sulfonates useful in the invention compositions are made from the lignin of sulfite pulpmill liquors and are commercially available under the trade names "Lignosol" TSF, "Lignosol" TSD and "Lignosol" TSF-65. The term "lignin" is used collectively herein to define a group of highly polymerized compouds of very similar chemical properties but of widely varying molecular weights. The similar chemical properties result from the fact that the lignin macromolecules are all built up from repeating 4-hydroxy-3-methoxyphenylpropane monomer units in a similar manner but to different degrees of molecular size and weight. The basic structure is retained during the conversion to the lignin sulfonate with the result that commercially available ammonium lignin sulfonates are compounds containing a mixture of macromolecules of widely different size. Ammonium lignin sulfonates having average molecular weights between 8,000 and 13,000 with a minimum distribution of the lower molecular weight fractions are preferred herein.

Commercial preparations of the aforesaid sulfonated mono- and disazo acid dyes are normally made by adjusting, i.e., standardizing, the concentrated dye to a certain strength by adding a standardizing agent which does not interfere with the subsequent dyeing process. Conventional commercial agents include dextrin, starch derivatives, naphthalene-formaldehyde sulfonates, saccharose, sodium sulfate and the like, and are used in amounts sufficient to obtain a strength which is suitable to the dyer. For a given acid dye, there may be a number of different strengths or "brands" required by various sections of the consuming industries.

In the invention, the sparingly soluble mono- or disulfonated, mono- or disazo acid dye, substantially in the sodium or other alkali metal salt form, is admixed with the ammonium lignin sulfonate using normal grinding and dye standardization techniques. Thus, the wet acid dye paste can be mixed with the ammonium lignin sulfonate and the composition then dried by spray drying, oven drying or other means. The resultant composition can then be ground in a mill and sieved. Alternatively, and preferably, the wet acid dye paste is first spray dried and subsequently ground and mixed with the requisite amount of ammonium lignin sulfonate to provide the final standardized acid dye composition.

Amounts of ammonium lignin sulfonate ranging from 0.4 part to 4 parts per part of crude acid dye are normally used in the invention. Smaller proportions are not always entirely satisfactory, while larger proportions are generally unnecessary and wasteful. Larger proportions of the ammonium lignin sulfonate may be beneficial, however, where the dye or other agents used therewith or present in the dye bath contain undue amounts of alkali metals.

Optionally, other additives usually associated with the dye in commercial packages can be present provided they do not interfere with the cold water-solubility of the dye in the presence of said ammonium lignin sulfonate. For example, it is often advantageous to incorporate small amounts, on the order of 2 to 4% by weight of the acid dye composition, of an antidusting agent consisting of a mixture of diethylcyclohexylamine lauryl sulfate and oleyl alcohol in a hydrocarbon oil during the standardization process.

Mono- and disazo acid dyes, particularly monoazo dyes containing a single sulfonic acid group and substantially in the form of their sodium salts, when standardized with an ammonium lignin sulfonate according to the present invention, have at least 10 g. and usually from 50 to 100 g. per liter cold water-solubility. In many cases, this is 2 to 3 times the normal solubility of the crude acid dye.

Surprisingly, it has been found that standardization of the acid dyes described herein with other diluents normally used in the art tends to adversely affect their cold water-solubility. However, with the ammonium lignin sulfonates the cold water-solubility is not adversely affected as with the other diluents and in many cases, as shown more fully hereinafter, is substantially improved.

The alkali metal salt forms, preferably the sodium salt form, of the acid dye and the ammonium salt form of the lignin sulfonate are normally used in the standardized acid dye compositions and have satisfactory cold water-solubility in accordance with the objectives of this invention. The ammonium ion in such form is effective to counter the insolubilizing effect of the sodium ion present in the sulfonated acid dyes described herein. It will be apparent to those skilled in the art that equally beneficial cold water-solubility may also be obtained by using the ammonium salt form of the sulfonated acid dye and the alkali metal, including ammonium salt form, of the lignin sulfonate, the amount of ammonium ion being sufficient to provide cold water-solubility to the degree described herein.

The invention acid dye compositions offer convenience to the dyer because of their ready ease of dissolution. Furthermore, this high order of solubility allows preparation of concentrated acid dye solutions in the mill and eliminates the need for more expensive organic solvent containing liquid acid dyes, since the dyer can make up his own liquid dye as needed from the powder.

The acid dye compositions of the invention are useful for the dyeing and printing of nitrogenous materials such as silk, wool and especially synthetic polyamides. Dyeing and printing are carried out by the methods usually used in these applications. Normally, the acid dye compositions according to the invention are dissolved in water at 10° to 30° C. and the solution is added to the dye bath which expediently contains the necessary amounts of other dye bath additives.

The following examples illustrate but do not limit the invention. All parts and percentages are given by weight.

EXAMPLES I-1 TO I-3 (COMPARISON EXAMPLES I-A TO I-M)

Examples I-1 to I-3 in Table 1 are illustrative of the invention compositions and were prepared by grinding and mixing nine parts of a monosulfonated, monoazo acid dye of the formula

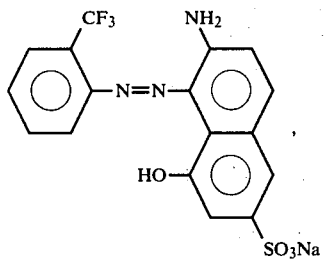

0.40 part of a diethylcyclohexylamine lauryl sulfate-oleyl alcohol antidusting oil and 10.6 parts of a commercial "Lignosol" ammonium lignin sulfonate. Comparative Examples I-A to I-L were similarly prepared using 9 parts of the aforesaid acid dye, 0.40 part of antidusting oil and the standardizing agent(s) in the amounts specified in Table 1.

Example I-M represents the acid dye itself without any standardizing agent added.

One part of each standardized dye was shaken for one hour at ambient temperature with 10 ml. of hard water (0.10 part of anhydrous calcium chloride and 0.10 part of magnesium sulfate in 100 ml. of distilled water). The resultant mixture was allowed to stand at ambient temperature for 20 hours. A one-ml. aliquot of supernatant solution was withdrawn and diluted to 100 ml. with a 75/25 by volume mixture of dimethylacetamide/acetic acid. Further dilution was made as required to obtain an absorbence value of 1.00 or less as measured with a Beckman Recording Spectrophotometer, Model DBG. The spectral absorbence was then recalculated back to the original 1 ml. aliquot to give an absorbence value corresponding to the solution of the acid dye composition in cold hard water. The absorbence values as well as the percent relative absorbence using the absorbence value of the acid dye composition containing "Lignosol" TSF as the standard are listed in Table 1.

The use of conventional, commercially available acid dye standardizing agents such as dextrin, starch, ammonium sulfate, trisodium phosphate and sodium naphthalene sulfonates (Comparative Examples I-A to I-D and I-F) provided inferior cold hard water-solubility as compared to the ammonium lignin sulfonates used in the invention. Surprisingly, the invention ammonium lignin sulfate acid dye compositions have much better cold hard water-solubility than the analogous sodium, lithium, or potassium lignin sulfonate compositions (Comparative Examples I-E, I-K and I-L). Mixtures of either sodium sulfate and an ammonium lignin sulfonate (I-G and I-H) or ammonium sulfate and a sodium lignin sulfonate (I-I and I-J) also have inferior cold water-solubility as compared to the invention compositions.

TABLE 1

| Example No. | Standardizing Agent (parts) | Absorbence | Relative Absorbence (%) |
|---|---|---|---|
| I-1 | "Lignosol" TSF (10.6) | 1320 | 100 |
| I-2 | "Lignosol" TSD (10.6) | 1144 | 87 |
| I-3 | "Lignosol" TSF-65 (10.6) | 1440 | 109 |
| I-A | $(NH_4)_2SO_4$ (10.6) | 11 | 0.8 |
| I-B | Dextrin (10.6) | 700 | 53 |
| I-C | "MOR-REX" 1918 (10.6)[a] | 700 | 53 |
| I-D | "Tamol" SN (10.6)[b] | 370 | 28 |
| I-E | "Lignosol" SFX-65 (10.6)[c] | 292 | 22 |
| I-F | $Na_3PO_4$ (10.6) | 62 | 5 |
| I-G | "Lignosol" TSF (9.6) $Na_2SO_4$ (1.0) | 800 | 61 |
| I-H | "Lignosol" TSF (8.6) $Na_2SO_4$ (2.0) | 620 | 47 |
| I-I | "Lignosol" SFX-65 (9.6) $(NH_4)_2SO_4$ (1.0) | 450 | 34 |
| I-J | "Lignosol" SFX-65 (8.6) $(NH_4)_2SO_4$ (2.0) | 727 | 55 |
| I-K | Potassium lignin sulfonate (10.6) | 228 | 17 |
| I-L | Lithium lignin sulfonate (10.6) | 440 | 33 |
| I-M | — | 650 | 49 |

[a]solubilized starch derivative
[b]sodium salt of naphthalene sulfonic acid
[c]sodium lignin sulfonate

EXAMPLE II-1 (COMPARATIVE EXAMPLES II-A TO II-I)

Example II-1 of the invention and Comparative Examples II-A to II-H in Table 2 were prepared by grinding and mixing 10.96 parts of a monosulfonated, disazo acid dye of the formula

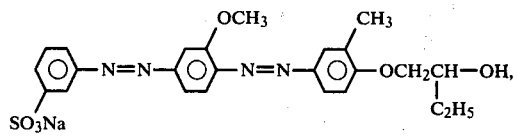

0.40 part of a diethylcyclohexylamine lauryl sulfate-oleyl alcohol antidusting oil and the specified amounts of standardizing agent(s) given in Table 2. Comparative Example II-I represents the acid dye itself without any standardizing agent added. The absorbencies and percent relative absorbencies were determined as described in Example I.

TABLE 2

| Example No. | Standardizing Agent (parts) | Absorbence | Relative Absorbence (%) |
|---|---|---|---|
| II-1 | "Lignosol" TSF (8.64) | 1950 | 100 |
| II-A | "Lignosol" SFX-65 (8.64) | 740 | 38 |
| II-B | "Lignosol" TSF (7.64) $Na_2SO_4$ (1.0) | 780 | 40 |
| II-C | "Lignosol" TSF (6.64) $Na_2SO_4$ (2.0) | 500 | 26 |
| II-D | "Lignosol" SFX-65 (7.64) | 670 | 34 |

TABLE 2-continued

| Example No. | Standardizing Agent (parts) | Absorbence | Relative Absorbence (%) |
|---|---|---|---|
| II-E | (NH₄)₂SO₄ (1.0) "Lignosol" SFX-65 (6.64) | 470 | 24 |
| II-F | (NH₄)₂SO₄ (2.0) Potassium lignin sulfonate (8.64) | 590 | 30 |
| II-G | Lithium lignin sulfonate (8.64) | 300 | 15 |
| II-H | Dextrin (8.64) | 1900 | 97 |
| II-I | — | 2285 | 117 |

EXAMPLES III-1 TO III-3 (COMPARATIVE EXAMPLES III-A TO III-F)

Examples III-1 to III-3 of the invention and Comparative Examples III-A to III-E were prepared as described in Example I using 7.8 parts of a monosulfonated, disazo acid dye of the formula

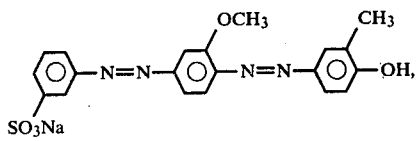

0.40 part of diethylcyclohexylamine lauryl sulfate-oleyl alcohol antidusting oil and the standardizing agent(s) in the amounts specified in Table 3. Comparative Example III-F represents the acid dye itself without any standardizing agent added. The absorbencies and percent relative absorbencies were determined as described in Example I.

TABLE 3

| Example No. | Standardizing Agent (parts) | Absorbence | Relative Absorbence (%) |
|---|---|---|---|
| III-1 | "Lignosol" TSF (11.8) | 1720 | 100 |
| III-2 | "Lignosol" TSD (11.8) | 1876 | 109 |
| III-3 | "Lignosol" TSF-65 (11.8) | 1680 | 98 |
| III-A | (NH₄)₂SO₄ (11.8) | 138 | 8 |
| III-B | Dextrin (11.8) | 1416 | 82 |
| III-C | "Tamol" SN (11.8) | 1270 | 74 |
| III-D | "Lignosol" SFX-65 (11.8) | 736 | 43 |
| III-E | Na₃PO₄ (11.8) | 312 | 18 |
| III-F | — | 2510 | 146 |

EXAMPLES IV-1 TO IV-3 (COMPARATIVE EXAMPLES IV-A TO IV-G)

12.4 Parts of a disulfonated, monoazo acid dye of the formula

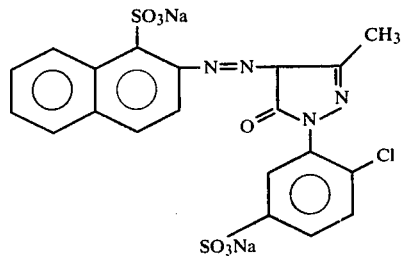

was standardized with 0.40 part of diethylcyclohexylamine lauryl sulfate-oleyl alcohol antidusting oil and 7.2 parts of each of the standardizing agents specified in Table 4, except for Comparative Example IV-G which did not contain a standardizing agent. The absorbencies and the percent relative absorbencies were determined as described in Example I.

TABLE 4

| Example No. | Standardizing Agent (parts) | Absorbence | Relative Absorbence (%) |
|---|---|---|---|
| IV-1 | "Lignosol" TSF (7.2) | 1636 | 100 |
| IV-2 | "Lignosol" TSD (7.2) | 1640 | 100 |
| IV-3 | "Lignosol" TSF-65 (7.2) | 1676 | 102 |
| IV-A | (NH₄)₂SO₄ (7.2) | 1746 | 107 |
| IV-B | Dextrin (7.2) | 1742 | 106 |
| IV-C | "MOR-REX" 1918 (7.2) | 1690 | 103 |
| IV-D | "Tamol" SN (7.2) | 1696 | 104 |
| IV-E | "Lignosol" SFX-65 (7.2) | 1520 | 93 |
| IV-F | Na₃PO₄ (7.2) | 1464 | 89 |
| IV-G | — | 1160 | 71 |

EXAMPLE V-1 (COMPARATIVE EXAMPLES V-A TO V-I)

5.42 Parts of a disulfonated, monoazo acid dye of the formula

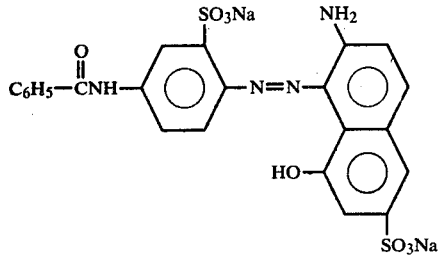

was standardized with 0.20 part of diethylcyclohexylamine lauryl sulfate-oleyl alcohol antidusting oil and the standardizing agent(s) in the amounts specified in Table 5, except for Comparative Example V-I which did not contain a standardizing agent. The absorbencies and the percent relative absorbencies were determined as described in Example I.

TABLE 5

| Example No. | Standardizing Agent (parts) | Absorbence | Relative Absorbence (%) |
|---|---|---|---|
| V-1 | "Lignosol" TSF (4.18) | 70.5 | 100 |
| V-A | "Lignosol" SFX-65 (4.18) | 45.0 | 64 |
| V-B | "Lignosol" TSF (3.18) Na₂SO₄ (1.0) | 56.5 | 80 |
| V-C | "Lignosol" TSF (2.18) Na₂SO₄ (2.0) | 47.0 | 67 |
| V-D | "Lignosol" SFX-65 (3.18) (NH₄)₂SO₄ (1.0) | 37.0 | 52 |
| V-E | "Lignosol" SFX-65 (2.18) (NH₄)₂SO₄ (2.0) | 37.5 | 53 |
| V-F | Potassium lignin sulfonate (4.18) | 33.0 | 47 |
| V-G | Lithium lignin sul- | 66.5 | 94 |

TABLE 5-continued

| Example No. | Standardizing Agent (parts) | Absorbence | Relative Absorbence (%) |
| --- | --- | --- | --- |
|  | fonate (4.18) |  |  |
| V-H | Dextrin (4.18) | 380 | 539 |
| V-I | — | 73.7 | 105 |

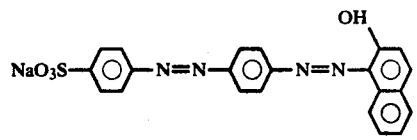

We claim:

1. A cold water-soluble dye composition consisting essentially of, by weight, from 20 to 70% of a sparingly soluble mono- or disulfonated, mono- or disazo acid dye, substantially in the form of its alkali metal salt, and from 80 to 30% of an ammonium lignin sulfonate.

2. The composition of claim 1 wherein the dye is substantially in the form of its sodium salt.

3. The composition of claim 2 wherein the dye is a monosulfonated, monoazo acid dye.

4. The composition of claim 2 wherein the dye is a disulfonated, monoazo acid dye.

5. The composition of claim 2 wherein the dye is a monosulfonated, disazo acid dye.

6. The composition of claim 3 wherein the dye is

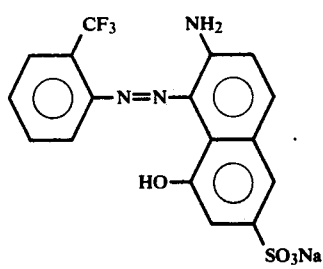

7. The composition of claim 3 wherein the dye is

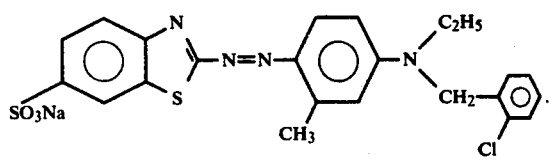

8. The composition of claim 4 wherein the dye is

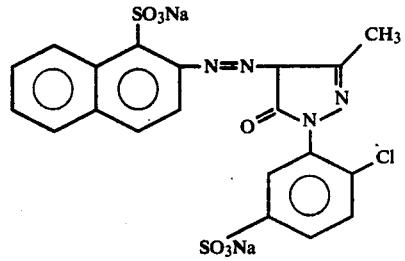

9. The composition of claim 4 wherein the dye is

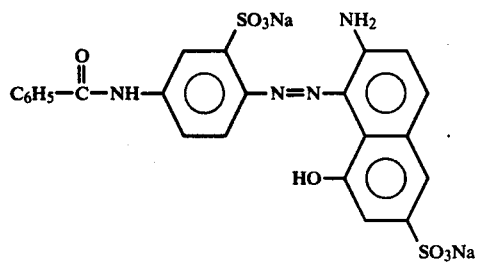

10. The composition of claim 5 wherein the dye is

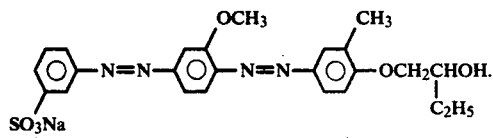

11. The composition of claim 5 wherein the dye is

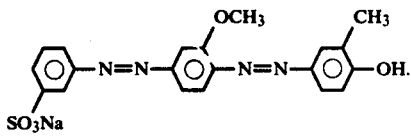

12. The composition of claim 5 wherein the dye is